(12) United States Patent
Horiuchi et al.

(10) Patent No.: US 8,152,229 B2
(45) Date of Patent: Apr. 10, 2012

(54) SUNROOF APPARATUS

(75) Inventors: Shigehito Horiuchi, Tochigi (JP); Kouichi Hotta, Tochigi (JP); Hiroyuki Tsukamoto, Tochigi (JP); Masayuki Daio, Hiroshima (JP)

(73) Assignees: Yachiyo Industry Co., Ltd., Saitama (JP); Nishikawa Rubber Co., Ltd., Hiroshima (JP)

( * ) Notice: Subject to any disclaimer, the term of this patent is extended or adjusted under 35 U.S.C. 154(b) by 422 days.

(21) Appl. No.: 12/587,745

(22) Filed: Oct. 13, 2009

(65) Prior Publication Data

US 2010/0096889 A1   Apr. 22, 2010

(30) Foreign Application Priority Data

Oct. 16, 2008 (JP) .................................. 2008-267289

(51) Int. Cl.
*B60J 10/12* (2006.01)
(52) U.S. Cl. ................................................. 296/216.09
(58) Field of Classification Search . 296/216.06–216.09
See application file for complete search history.

(56) References Cited

U.S. PATENT DOCUMENTS

| 5,039,161 | A  | * | 8/1991 | Schmidhuber et al. | ........ 296/212 |
| 6,685,263 | B2 | * | 2/2004 | Sawada et al. | ........... 296/216.06 |
| 6,837,538 | B2 | * | 1/2005 | Itoh et al. | ................. 296/216.06 |

FOREIGN PATENT DOCUMENTS

JP   2004-114924   4/2004

* cited by examiner

*Primary Examiner* — Dennis Pedder
(74) *Attorney, Agent, or Firm* — Carrier Blackman & Associates, P.C.; Joseph P. Carrier; William D. Blackman

(57) ABSTRACT

A sunroof apparatus for opening or closing an opening formed on a fixed roof of an automobile includes: a movable front panel and a movable rear panel both provided in the fixed roof; a panel frame made of engineering plastic and attached around one of the panels; a hollow elastic weatherstrip attached around the panel frame attached around the one of the panels; a panel frame made of the engineering plastic and attached on a periphery end section of other one of the panels, the other one of the panels having a butt end section and the periphery end section; and a hollow elastic weatherstrip attached to the panel frame attached to the other one of the panels, wherein the opening is closed when the weatherstrip of the one of the panels and the butt end section of the other one of the panels butt against each other. This structure can enhance efficiency in molding weatherstrips since the weatherstrip attached around the two panels are in a hollow structure.

4 Claims, 5 Drawing Sheets

SUNROOF APPARATUS

CROSS REFERENCE TO RELATED APPLICATIONS

This application claims the foreign priority benefit under Title 35, United States Code, §119 (a)-(d), of Japanese Patent Application No. 2008-267289, filed on Oct. 16, 2008, in the Japan Patent Office, the disclosure of which is herein incorporated by reference in its entirety.

BACKGROUND OF THE INVENTION

1. Field of the Invention

The present invention relates to an automobile sunroof apparatus.

2. Related Art

Japanese Patent Laid-open Publication No. 2004-114924 discloses a conventional example of a sunroof apparatus having opening/closing panels separated in the longitudinal direction of an automobile (see paragraphs [0010] to [0015]). The publication discloses a technique for enhancing a sealing capability between two weatherstrips in closed and butted state where one of the weatherstrips formed on one of the panels has a hollow structure, and the other one of the weatherstrips formed on the other one of the panels has a solid structure.

Preferably, a section of the weatherstrip which is to be butted against a roof of a vehicle should have a hollow structure because the section to be butted must be elastically deformed to a tolerable degree in order to enhance sealing capability therebetween. The aforementioned publication discloses a technique of providing a solid structure to a portion of the weatherstrip of the other one of the panels which is to be butted against the one of the panels, and providing a hollow structure to a portion of the weatherstrip which is to be butted against the roof of the vehicle.

However, it is disadvantageous to provide two different, i.e., a hollow structure and a solid structure in one piece of weatherstrip because a mold for producing a weatherstrip tends to be complex.

SUMMARY OF THE INVENTION

The present invention is conceived to solve the aforementioned circumstance, and an object thereof is to provide a sunroof apparatus capable of improving productivity of a mold used for producing hollow weatherstrips attached to two separated panels.

The present invention provides a sunroof apparatus, for opening or closing an opening formed on a fixed roof of an automobile, including: a movable front panel and a movable rear panel both provided in the fixed roof; a panel frame made of engineering plastic and attached around one of the panels; a hollow elastic weatherstrip attached around the panel frame attached around the one of the panels; a panel frame made of the engineering plastic and attached on a periphery end section of other one of the panels, the other one of the panels having a butt end section and the periphery end section; and a hollow elastic weatherstrip attached to the panel frame attached to the other one of the panels, wherein the opening is closed when the weatherstrip of the one of the panels and the butt end section of the other one of the panels butt against each other.

This sunroof apparatus can achieve superior sealing capability since the hollow elastic weatherstrip and the rigid panel frame made of the engineering plastic butt against each other.

In addition, since both weatherstrips, which are to be attached to the front panel and the rear panel, can be molded to have a hollow structure since either one of the weatherstrips, attached around the front panel 4 and to the rear panel 5 and butted against each other, may not have to have a solid structure, inexpensive panels can be produced by using a simple mold for molding only hollow weatherstrips.

The sunroof apparatus according to the present invention further includes: an engagement pin formed integrally with an end section of the weatherstrip of the other one of the panels in the vicinity of the butt end section; and an engagement hole drilled on the panel frame of the other one of the panels and engaging the engagement pin received therethrough.

Since the sunroof apparatus according to the present invention can facilitate positioning of the weatherstrip to the panel frame by inserting the engagement pin through the engagement hole of the other one of the panels, the time can be shortened for attaching the weatherstrip itself to the panel frame.

The sunroof apparatus according to the present invention further includes: an elastic bulged portion formed at a corner section of the weatherstrip of the one of the panels; and a recessed section formed on an end of the weatherstrip of the other one of the panels in the vicinity of the butt end section and accommodating the elastic bulged portion when the opening is closed.

The sunroof apparatus having the recessed section for accommodating the elastic bulged portion of the weatherstrip of the one of the panels allows the weatherstrips to be deformed appropriately, and thus the weatherstrips and the panels can form a flush surface easily.

In the sunroof apparatus according to the present invention, the front panel tilts up from the fixed roof and slides, the rear panel tilts down from the fixed roof and slides, and the front panel is the one of the panels, and the rear panel is the other one of the panels.

In the sunroof apparatus according to the present invention, the front panel in an open state is exposed outside the automobile if the front panel tilts up and slides and the rear panel tilts down and slides. The weatherstrip attached around the front panel will not damage appearance of the front panel aesthetically.

In the present invention, both weatherstrips, which are to be attached to the front panel and the rear panel respectively, can be molded to have a hollow structure since either one of the weatherstrips, attached on the front panel and the rear panel and butted against each other, may not have to have a solid structure. Therefore, inexpensive panels can be produced by using a simple mold for molding only hollow weatherstrips.

DETAILED DESCRIPTION OF THE INVENTION

Figure 1:
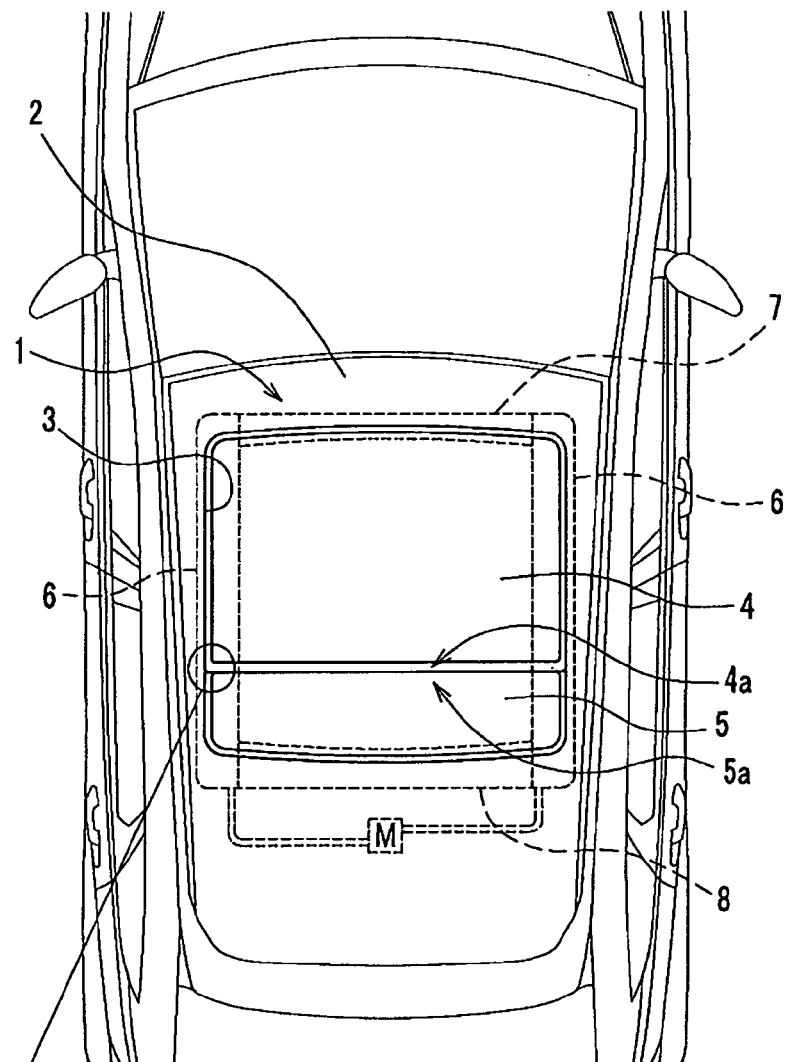
FIG. 1 is a plan view showing a sunroof apparatus according to the present invention.
Figure 1:
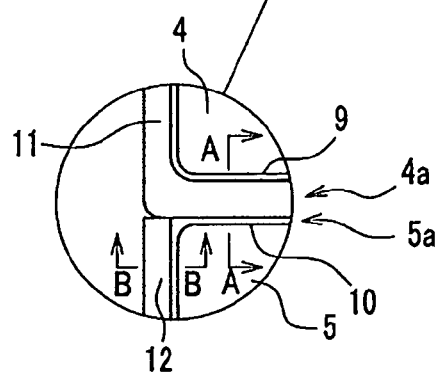
Figure 2A:
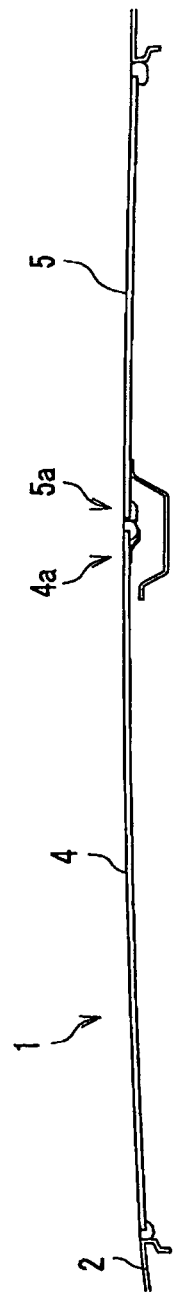
FIGS. 2A to 2C are side views showing movements of the sunroof apparatus according to the present invention.
Figure 2B:
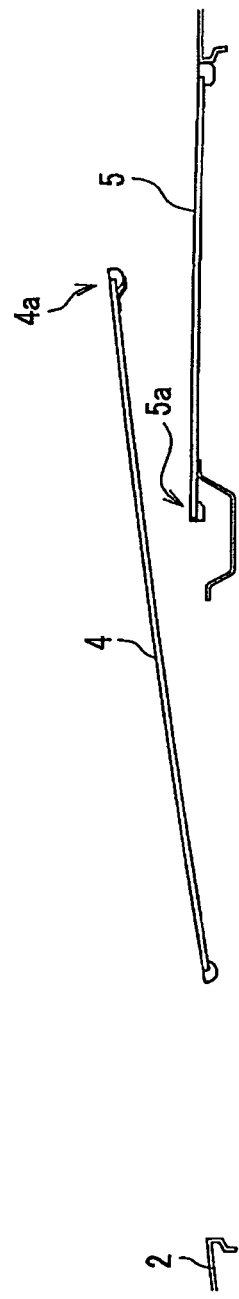
Figure 2C:
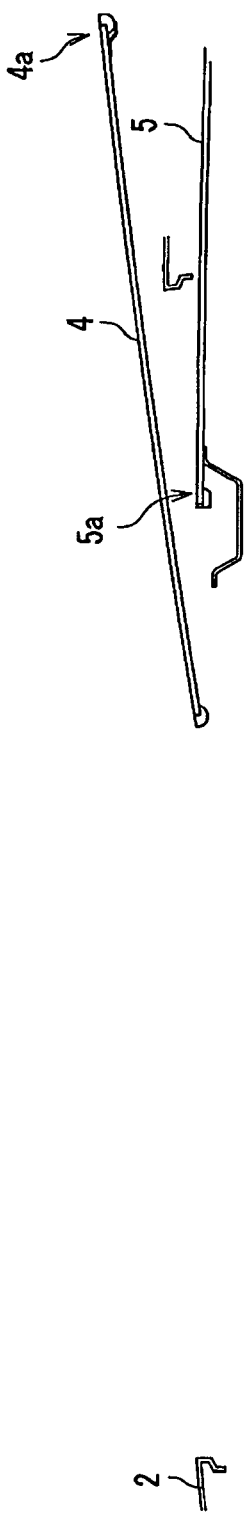

FIG. 1 is a plan view showing a sunroof apparatus 1 according to the present invention, and FIGS. 2A to 2C are side views showing movements of the sunroof apparatus 1 according to the present invention. The sunroof apparatus 1 having a so-called dual panel structure has a movable front panel 4 and a movable rear panel 5 both of which are separately attached on a fixed roof 2 of an automobile for opening or closing an opening 3 formed on the fixed roof 2 in its longitudinal direction. The opening 3 is closed by butting a rear periphery 4a of the front panel 4 and a front periphery 5a of the rear panel 5.

A pair of lateral frames 6, a front frame 7, and a rear frame 8 are disposed beneath peripheries of the opening 3. The lateral frames 6 have a sliding mechanism (not shown in the drawings) which opens or closes the two panels when the sliding mechanism is driven by a motor M as a driving power source.

The sunroof apparatus 1 according to the present embodiment tilts up and slides the front panel 4, and tilts down and slides the rear panel 5. FIG. 2A shows the rear periphery 4a of the front panel 4 and the front periphery 5a of the rear panel 5 butting against each other and closing the opening 3. In an attempt to open the opening 3, the front panel 4 at first tilts up and slides backward as shown in FIG. 2B. Before the rear panel 5 slides backward fully, the rear panel 5 starts tilting down and sliding backward. The opening 3 is fully opened when the two panels finish the backward sliding movements.

Figure 3:
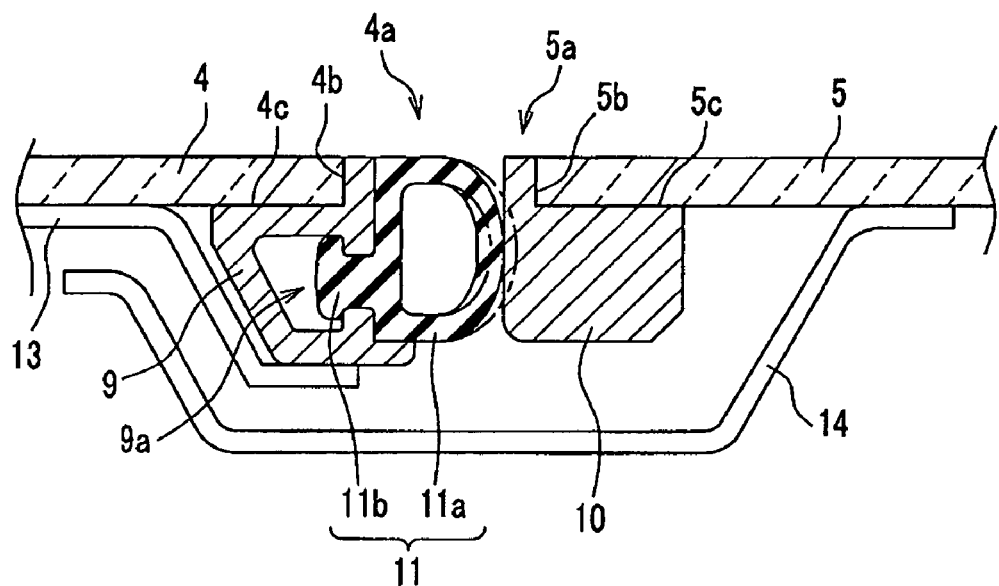
FIG. 3 is a cross-sectional view taken along line A-A of FIG. 1.
Figure 4:
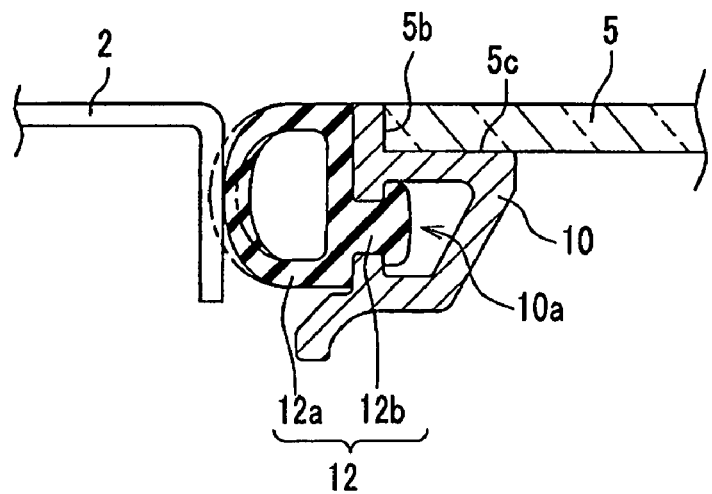
FIG. 4 is a cross-sectional view taken along line B-B of FIG. 1.

FIG. 3 is a cross-sectional view taken along line A-A of FIG. 1, and FIG. 4 is a cross-sectional view taken along line B-B of FIG. 1. Dotted lines shown in FIGS. 3 and 4 indicate the weatherstrips 11 and 12 in non-deformed states. In the present embodiment, the front panel 4 and the rear panel 5 are made of glass. A panel frame 9 or 10 made of engineering plastic is fixed around each panel. More specifically, the panel frame 9 is adhered to an end surface 4b and to a bottom surface 4c both formed around a periphery of the front panel 4 so that the upper surface of the panel frame 9 is flush with the upper surface of the front panel 4. Similarly, a panel frame 10 is adhered to an end surface 5b and to a bottom surface 5c both formed around a periphery of the rear panel 5 so that the upper surface of the panel frame 10 is flush with the upper surface of the rear panel 5.

The panel frames 9 and 10 are fixed to the front panel 4 and the rear panel 5 respectively by, for example, outsert molding. A method used in the outsert molding may be injection molding, or extrusion molding etc. The front panel 4 is adhered to the panel frame 9 by an adhesive provided at an interface therebetween, and the rear panel 5 is adhered to the panel frame 10 by an adhesive provided at an interface therebetween. An undercoating agent may be used with the adhesive if necessary. Adhesives for use in the present invention may not be limited to a particular type. Olefin-based adhesives may be preferable for adhering the glass-made front panel 4 to the panel frame 9 made of a thermoplastic polystyrene elastomer (hereinafter called TPS), or for adhering the glass-made panels 4 to the TPS-made panel frame 10 because the Olefin-based adhesives have superior capability of adhering a glass-made component to a TPS-made component.

The front panel 4 and the rear panel 5 may be made of not glass but engineering plastic such as acrylic resin and polycarbonate resin, or a steel sheet. The panel frames 9 and 10 may be made of not TPS but thermoplastic polyolefin elastomer (hereinafter called TPO), thermoplastic polyether-ester elastomer (hereinafter called TPEE), thermoplastic polyurethane elastomer (hereinafter called TPU), polyvinyl chloride (hereinafter called PVC), thermoplastic polyamide elastomer (hereinafter called TPAE), or a fluoroubber etc. Preferably, the panel frames 9 and 10 should be made of TPS or TPO when considering their lower environmental load, anti-scratch durability, and superior adhesion to a glass-made component, if the front panel 4 and the rear panel 5 are made of glass. More specifically, TPS may be the most preferable when considering high temperature liquidity when being molded.

The weatherstrip 11 is attached to the panel frame 9, and the weatherstrip 12 is attached to the panel frame 10. In the present embodiment, the hollow elastic weatherstrip 11 is attached around the panel frame 9 of the front panel 4, and the hollow elastic weatherstrip 12 is attached to a butt end section, which does not include the front periphery 5a of the rear panel 5, of the panel frame 10. A holder 13 attached to the bottom surface of the front panel 4 supports the bottom section of the panel frame 9. In addition, a drain frame 14 is attached on the bottom surface of the rear panel 5 for receiving water dripping from a gap formed between the panels while the panels are moving.

As shown in FIG. 3, an engagement slit 9a having an opening directed laterally outward of the front panel 4 is formed on the panel frame 9. The weatherstrip 11 is pushed into the engagement slit 9a and engaged thereat. The weatherstrip 11 has a sealing section 11a having a hollow structure and contacting the fixed roof 2 or the rear panel 5 elastically; and a bulbous portion 11b fitting into the engagement slit 9a. When the weatherstrip 11 is attached to the panel frame 9, the upper surface of the sealing section 11a is flush with the upper surface of the panel frame 9. Accordingly, the front panel as a whole has a flat surface. The sealing section 11a may be made of the same material as that of the bulbous portion 11b. But if the sealing section 11a is made of a soft synthetic rubber and the bulbous portion 11b is made of a material harder than the sealing section 11a, the sealing section 11a and the bulbous portion 11b are produced by, for example, double molding.

The panel frame 10 is similar to the panel frame 9 except the front periphery 5a. That is, as shown in FIG. 4, an engagement slit 10a having an opening directed laterally outward of the rear panel 5 is formed on the panel frame 10. The weatherstrip 12 is pushed into the engagement slit 10a and engaged thereat. The weatherstrip 12 has a sealing section 12a having a hollow structure and contacting the fixed roof 2 (see FIG. 1); and a bulbous portion 12b fitting into the engagement slit 10a. When the weatherstrip 12 is attached to the panel frame 10, the upper surface of the sealing section 12a is flush with the upper surface of the panel frame 10. Accordingly, the rear panel as a whole has a flat surface.

Usually, a rubber-made weatherstrip must be attached to a panel detachably. If the rubber-made weatherstrip is attached to the panel directly as shown in FIG. 1 of the aforementioned Japanese Patent Laid-open Publication No. 2004-114924, the weatherstrip must sandwich the periphery of the panel vertically; therefore, the panel as a whole hardly has a flat surface. In contrast, the present invention can provide the flat panel easily by fixing the panel frames 9 and 10 made of the engineering plastic to the panels 4 and 5 respectively; attaching the weatherstrips 11 and 12 to the panel frames 9 and 10 respectively; and engaging the bulbous portions 11b and 12b into the engagement slits 9a and 10a respectively.

The present invention utilizes the aforementioned advantageous panel frames in which the weatherstrip 11 of the front panel 4 butts against the panel frame 10 of the rear panel 5 as shown in FIG. 3. The front end of the front periphery 5a of the panel frame 10 is a vertical plane. Upon being pressed onto the front end of the rigid panel frame 10 made of engineering plastic, the hollow sealing section 11a of the weatherstrip 11 is deformed to a tolerable degree and thus exhibits a predetermined sealing capability. Not to mention, when the sealing section 11a of the weatherstrip 11 and the sealing section 12a of the weatherstrip 12 of the rear panel 5, both of which have a hollow structure, are pressed onto the rigid fixed roof 2 (see FIG. 1), they are deformed to tolerable degrees to exhibit predetermined sealing capability.

In the present invention, both weatherstrips, which are to be attached to the front panel 4 and the rear panel 5 respectively, can be molded to have a hollow structure since neither one of the weatherstrips, attached to the front panel 4 and the mar panel 5 and butted against each other, must have a solid structure. Therefore, inexpensive panels can be produced by using a simple mold for molding only hollow weatherstrips.

Figure 5:
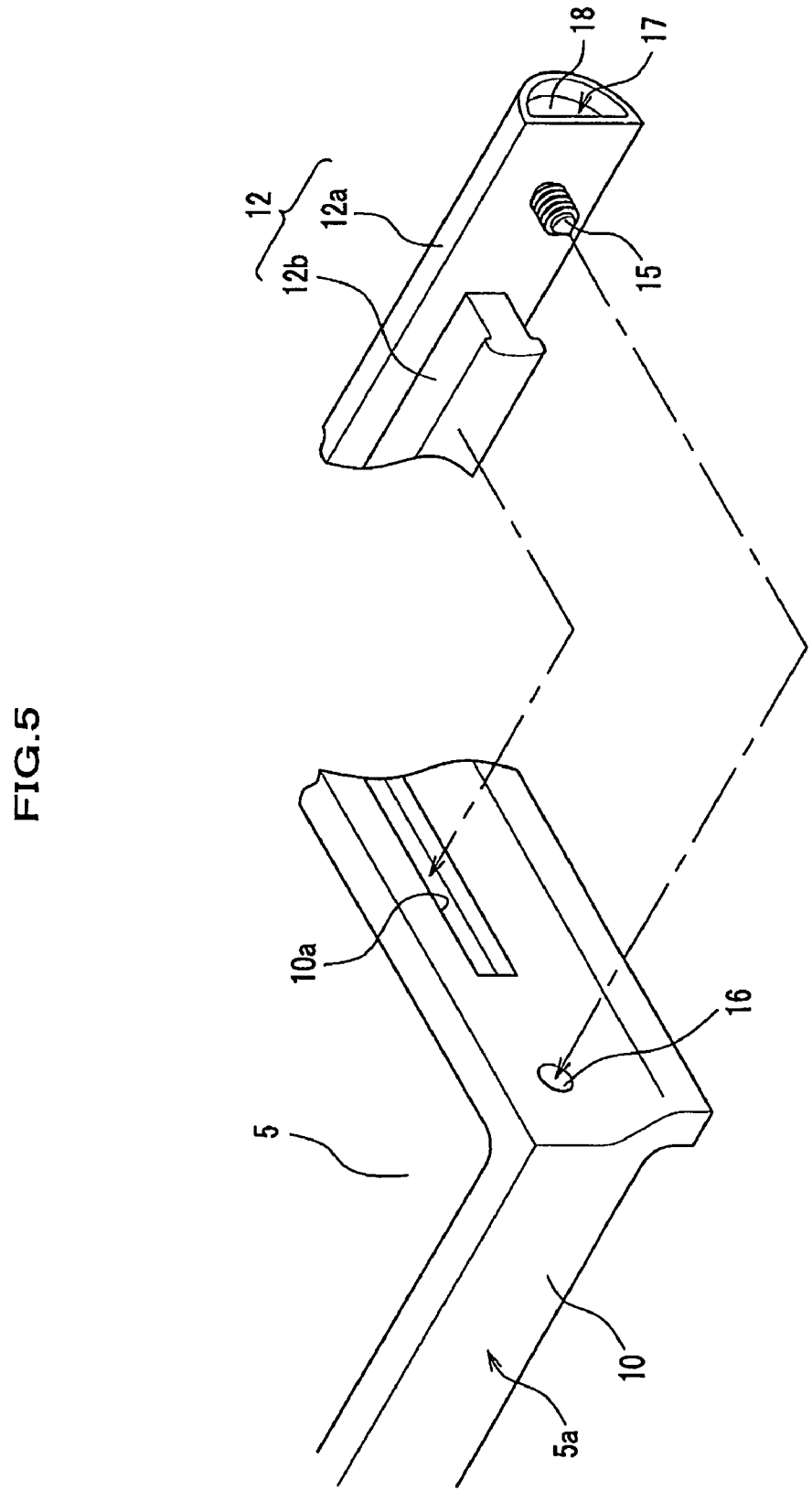
FIG. 5 is an exploded isometric view showing an example of method for attaching a weatherstrip to a front end of a panel frame of a rear panel.

FIG. 5 shows a structure for attaching the weatherstrip 12 to the front end of the panel frame 10 of the rear panel 5. To be more specific, an engagement pin 15 molded unitarily with the weatherstrip 12 and made of engineering plastic is pushed into and engaged at an engagement hole 16 drilled on the panel frame 10. This structure facilitates positioning of the weatherstrip 12 to the vicinity of the corner section of the front end of the panel frame 10 and shortens the time for attaching the weatherstrip 12 to the panel frame 10.

When a rear corner of the front panel 4 is butted against a front corner of the rear panel 5, the corner section of the weatherstrip 11 contacts a front end of the weatherstrip 12. The weatherstrips 11 and 12 and the panels 4 and 5 in the butting state do not form a flat surface since these soft components having a hollow structure may deform in arbitrary directions upon butting against each other.

Figure 6:
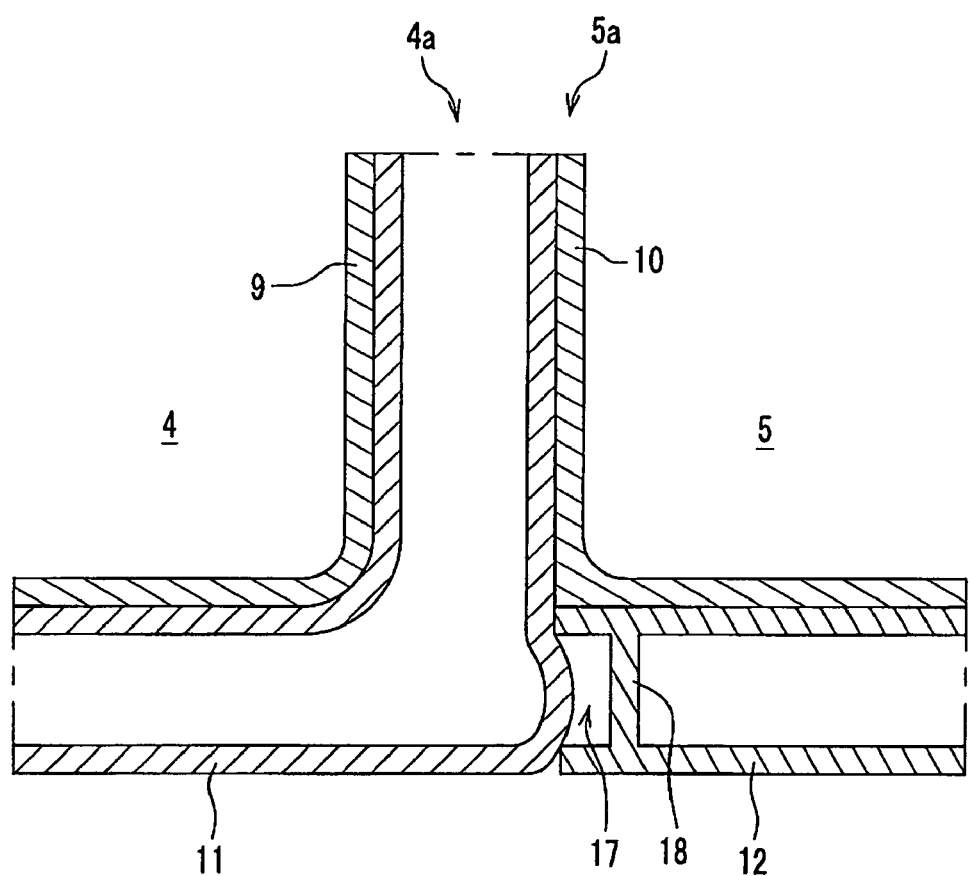
FIG. 6 is a plan view showing a cross-section in the vicinity of a rear corner of a front panel and in the vicinity of a front corner of a rear panel in a butted state.

To address this drawback, the present embodiment shown in FIG. 6 employs a recessed section 17 (see FIG. 5) which is formed on a front end of the weatherstrip 12 in the vicinity of the front periphery 5a of the rear panel 5 to accommodate an elastic bulged portion of the corner section of the weatherstrip 11 of the front panel 4 when the opening 3 (see FIG. 1) is closed. A partition wall 18 is formed in the weatherstrip 12 and at somewhat backward from the front end of the weatherstrip 12. A space ahead of the partition wall 18 forms the recessed section 17, and a space behind the partition wall 18 is a hollow section confined in the weatherstrip 12. The aforementioned structure of the recessed section 17 for accommodating the elastic bulged portion of the weatherstrip 11 allows the weatherstrips 11 and 12 to be deformed appropriately, and thus the weatherstrips 11 and 12, and the panels 4 and 5 can form a flat surface easily.

The best mode for carrying out the present invention has been explained as above. In the previously explained structure, the hollow elastic weatherstrip 11 is attached around the panel frame 9 attached around the front panel 4; and the hollow elastic weatherstrip 12 is attached to a butt end section of the panel frame 10 which does not include the front periphery 5a of the rear panel 5 so that the weatherstrip 11 is butted against the butt end section of the panel frame 10. Conversely, the hollow elastic weatherstrip 12 may be attached around the panel frame 10 attached around the rear panel 5; and the hollow elastic weatherstrip 11 may be attached to a butt end section of the panel frame 9 which does not include the rear periphery 4a of the front panel 4 so that the weatherstrip 12 is butted against the panel frame 9. In the sunroof apparatus according to the present invention, the front panel 4 in an open state is exposed outside the automobile if the front panel 4 tilts up and slides, and the rear panel 5 tilts down and slides. Taking appearance of the front panel 4 into consideration, the aforementioned best mode using the weatherstrip 11 attached around the front panel 4 is more preferable than the aforementioned conversive structure.

The sunroof apparatus according to the present invention includes not only the aforementioned dual panel structure but also a triple or multiple panel structure having three panels or more as long as the panels are arranged in the same manner as that of the front panel 4 and the rear panel 5 of the previously explained embodiment. The present invention is not limited to the features disclosed in the accompanying drawings and the aforementioned embodiment, and may be modified within the range or purpose of the present invention.

What is claimed is:

1. A sunroof apparatus for opening or closing an opening formed on a fixed roof of an automobile, the sunroof apparatus comprising:
    a movable front panel and a movable rear panel both provided in the fixed roof;
    a panel frame made of engineering plastic and attached around one of the panels;
    a hollow elastic weatherstrip attached around the panel frame attached around the one of the panels;
    a panel frame made of the engineering plastic and attached on a periphery end section of other one of the panels, the other one of the panels having a butt end section and the periphery end section; and
    a hollow elastic weatherstrip attached to the panel frame attached to the other one of the panels, wherein
    the opening is closed when the weatherstrip of the one of the panels and the butt end section of the other one of the panels butt against each other.

2. The sunroof apparatus as claimed in claim 1, further comprising:
    an engagement pin formed integrally with an end section of the weatherstrip of the other one of the panels in the vicinity of the butt end section; and
    an engagement hole drilled on the panel frame of the other one of the panels and engaging with the engagement pin received therethrough.

3. The sunroof apparatus as claimed in claim 1 or 2, further comprising:
    an elastic bulged portion formed at a corner section of the weatherstrip of the one of the panels; and
    a recessed section formed on an end of the weatherstrip of the other one of the panels in the vicinity of the butt end section and accommodating the elastic bulged portion when the opening is closed.

4. The sunroof apparatus as claimed in claim 1, wherein the front panel tilts up from the fixed roof and slides, the rear panel tilts down from the fixed roof and slides, and the front panel is the one of the panels, and the rear panel is the other one of the panels.

* * * * *